United States Patent
Kruger et al.

(10) Patent No.: US 8,070,005 B1
(45) Date of Patent: Dec. 6, 2011

(54) CORRUGATED SEPTIC TANK WITH STRENGTHENING FEATURES

(75) Inventors: Kurt J. Kruger, Hamden, CT (US);
James J. Burnes, Deep River, CT (US);
Brian Burnes, legal representative, Bristol, CT (US)

(73) Assignee: Infiltrator Systems Inc., Old Saybrook, CT (US)

( * ) Notice: Subject to any disclaimer, the term of this patent is extended or adjusted under 35 U.S.C. 154(b) by 88 days.

(21) Appl. No.: 12/455,782

(22) Filed: Jun. 5, 2009

Related U.S. Application Data (60) Provisional application No. 61/130,998, filed on Jun. 5, 2008.

(51) Int. Cl.
*B65D 6/00* (2006.01)
*B65D 8/00* (2006.01)

(52) U.S. Cl. ........................ 220/4.13; 220/670

(58) Field of Classification Search ............. 220/4.13, 220/565, 567.1, 670; 210/532.2
See application file for complete search history.

(56) References Cited

U.S. PATENT DOCUMENTS

| | | | |
|---|---|---|---|
| 3,383,004 A * | 5/1968 | Closner | 220/560.12 |
| 4,143,193 A | 3/1979 | Rees | |
| 4,359,167 A | 11/1982 | Fouss et al. | |
| 5,220,823 A | 6/1993 | Berg et al. | |
| 5,321,873 A | 6/1994 | Goria | |
| 5,406,759 A | 4/1995 | De Rosa et al. | |
| 5,470,515 A | 11/1995 | Grimm et al. | |
| 6,170,201 B1 | 1/2001 | Mason et al. | |
| 6,261,490 B1 | 7/2001 | Kliene | |
| 6,282,763 B1 | 9/2001 | Goria | |
| 6,698,610 B2 | 3/2004 | Berg et al. | |
| D498,815 S * | 11/2004 | Greer | D23/203 |
| 6,852,788 B2 | 2/2005 | Stevenson et al. | |
| 7,144,506 B2 | 12/2006 | Lombardi, II | |
| 7,178,686 B2 | 2/2007 | Bolzer et al. | |
| 2001/0019026 A1 | 9/2001 | Berg et al. | |
| 2002/0153380 A1 | 10/2002 | Wade | |

FOREIGN PATENT DOCUMENTS

| | | |
|---|---|---|
| EP | 1557251 | 7/2005 |
| EP | 1649997 | 4/2006 |
| GB | 2369596 | 6/2002 |

OTHER PUBLICATIONS

Nugent, Paul "Rotational Molding: A Practical Guide", www.paulnugent.com (2001) p. 119-124; 333-344; 465-471; 575-589.

Antosiewcz, F. "Plastic Vaults Help Lighten Burial Burden" Plastic News (Aug. 13, 2007) 2 pg.

(Continued)

*Primary Examiner* — Harry Grosso
(74) *Attorney, Agent, or Firm* — C. Nessler (57) ABSTRACT

A molded thermoplastic tank for use as a septic tank or storage tank when buried in soil has a combination of transverse peak and valley corrugations in combination with one or more lengthwise peak corrugations, to provide in effect a molded-in beam structure. The lengthwise corrugations may be at the top, between spaced apart access ports, along the bottom. In one embodiment, the top has an H-shape pattern beam structure. In another embodiment separately formed plastic beams and or a combination of vertical and horizontal struts are inside the tank.

11 Claims, 8 Drawing Sheets

OTHER PUBLICATIONS

Bay Systems, "Structurial Foam Rim" www.rimmolding.com (2004). 2 pg.

Premier Plastics Inc "Low Profile Supertank™ Septic Tank" www.premierplastics.com (2007) 2 pg.

Nassar Delphin Group "NDG Compact Sewage Treatment Plants" www.nassar-delphin-group.com (Undated), p. 1, 2, 7, 31, 34, 45, 47.

Rotonics Manufacturing Inc., "Septic Tanks" www.rotonics.com (2005) 2 pg.

Rotonics Manufacturing Inc, Cistern and Septic Tanks, www.rotonics.com(2003) 2 pg.

Roth Global Plastics Inc. "Plastic Septic Tanks Tanks" www.fnalo.net (2007) 1 pg.

* cited by examiner

CORRUGATED SEPTIC TANK WITH STRENGTHENING FEATURES

TECHNICAL FIELD

The present invention relates to tanks which are suited for containing water, particularly those which are buried in soil and used for treating wastewater.

BACKGROUND

Molded plastic tanks for holding and processing wastewater, have been long used in substitution of traditional concrete tanks. Plastic septic tanks that are commercially available are generally cylindrical and may have rectangular or round cross section. They have been made by blow molding or rotational molding. A typical tank is made of polyethylene having a thickness of one-quarter to three-eights of an inch. Tanks are often heavily ribbed or corrugated for strength, to resist unique forces when buried in soil and used. Typical volume capacities for domestic systems are in the range 1000-1500 gallons. Septic tanks must have access ports with closures, to permit maintenance. Most septic tanks have at least one baffle which limits lengthwise flow within the tank and divides the tank into an input end portion and the output end portion. Tanks also must resist the weight of overlying soils and possible vehicles or other weights which may be placed on the soil surface.

Advantages of molded plastic septic tanks include light weight and better resistance to impact damage and corrosion, and improved resistance to damage in the event of freezing. Disadvantages include light weight (which makes them buoyant), and limited structural rigidity which can result in distortion during installation and use. Septic tanks are periodically emptied as part of routine maintenance, to remove accumulated sludge. In the past few years, certain regulators have required that tanks pass certain tests which measure the propensity for distortion during installation or use. In one kind of test, a tank is subjected to a partial vacuum, e.g., a pressure 2 to 7 inch Hg less than standard atmospheric pressure. Such vacuum tends to pull the tank inwardly, simulating it is thought the pressure on an emptied tank which is buried in the soil, particularly in wet or non-cohesive soil.

Prior art plastic septic tanks have commonly had corrugations and other features for resisting the foregoing kinds of loads. In making tanks, the weight and cost of plastic material are major considerations. Therefore, one design objective is to maximize the volume to surface area ratio. Another consideration is to limit the size of excavation which is required. One approach is to have an oblong cross section tanks, e.g., where the cross section approximates a rectangle or square. However, such shape can present relatively large lightly curved or nearly flat surfaces. Tanks of such shape can need more strengthening than does a nearly circular cross section tank.

Tanks which have generally circumferential corrugations, with any cross section, can be susceptible to contracting lengthwise when subjected to interior vacuum or to soil forces which apply similar forces. When a tank having circumferential running ribs contracts, that behavior has been called "accordioning" by some. If tanks shrink in length when installed, or otherwise deform, and the soil in response moves inwardly, there can be undesirable diminution in the nominal volume of the tank. Another factor which affects tanks is that, when one is subject to heating by the sun or atmosphere prior to installation, that can lower the strength and stiffness of the plastic material, and make it more susceptible to distortion during handling or initial installation. So more strengthening may be needed for tanks than would appear from an analysis of the forces which result when they are buried.

Certain obvious ways of strengthening are nor particularly desirable because they tend to increase cost quite a bit. As a simple example, a tank may be made of a thicker material, or stronger material type. Thus there is a continued need for improvement in septic tanks and other like tanks for storing liquids when buried in soil and the like.

SUMMARY

An object of the invention is to provide a plastic tank for containing wastewater and other waters, and a method of making same, which tank has a structure and wall construction suited for resisting impact loads and sun-heating during storing, handling and installation; for resisting vacuum test loads; for resisting loads applied by soil, vehicles, and hold down devices. Another object is to provide a tank with a wall and ends which does not deform under vacuum testing. A further object is to provide a plastic tank which sounds more substantial to the ear when struck with an implement. A still further object is to provide the foregoing features for a cost which is at least comparable to current technology plastic tanks and which is attractive in competition with concrete tanks.

In accord with the invention, an embodiment of molded plastic tank for containing water, in particular for treating wastewater, comprises: a generally oblong body having a generally rectangular or circular cross section. The body is defined by a plastic wall and has opposing end caps. There are at least two spaced apart access ports in the top of the tank, disposed on either side of the midpoint of tank length. There is a plurality of corrugations running transverse to the tank length.

In alternative embodiments, the top has separately or in combination two or more of the following: (a) one or more lengthwise peak corrugations running along the top of the tank, generally between the ports, to provide a molded-in beam shape, for resisting soil loads on the tank and for resisting lengthwise compression ("accordion-ing") of the tank; (b) a pair of transverse corrugations at the ends of said lengthwise corrugations, in proximity to the ports, wherein the combination of three corrugations creating an H shape molded-in beam structure; (c) one or a plurality of lengthwise corrugations running substantially along the length of the bottom of the tank, spaced apart by lengthwise valleys, with and without interconnecting bridges between the lengthwise peak corrugations; (d) bands on opposing sides of the tank, running along the midpoint elevation of the tank, to thereby interrupt said transverse corrugations and interconnect the peaks of the transverse corrugations; (e) when the tank has a generally rectangular cross section, a plurality of buttresses or steps at each of the two top corners at each end of the tank, in combination with a horizontal end beam flange; (f) one or a plurality of lengthwise corrugations running substantially along the length of the bottom of the tank, spaced apart by lengthwise valleys, with and without interconnecting bridges between the lengthwise peak corrugations; and with or without sub-valleys within the lengthwise valley corrugations; (g) a plurality of the transverse peak corrugations at the bottom of the tank having a reinforcing rib which runs along the length of the corrugation and transversely to the length of the tank; (h) one or more separately molded beam components positioned within the tank and within the interior cavity of said at least one lengthwise corrugations; (i) at least two vertical spaced apart struts and at least one interconnected horizontal strut, for supporting the top of the tank; a baffle captured between the struts.

The foregoing and other objects, and the features and advantages of the present invention will become more apparent from the following description of preferred embodiments and accompanying drawings.

DESCRIPTION

Generally, the tank described below has a multiplicity of features which are symmetrically disposed. In referring to the Figures, where there are duplicate elements they have suffixes; for example, F or R (generally, front and rear) and A or B (generally, left and right in front view). A reference to a number without a suffix shall be understood to refer to any of the multiplicity of such elements have suffixes. A tank of the invention has certain shapes which are characterized as molded-in beam structures. By that is meant that if the particular portion were cut from the tank and used elsewhere it would have beam-like function. Also described are actual separate beams which may be nested within the molded-in beam structures for further strength.

Figure 1:
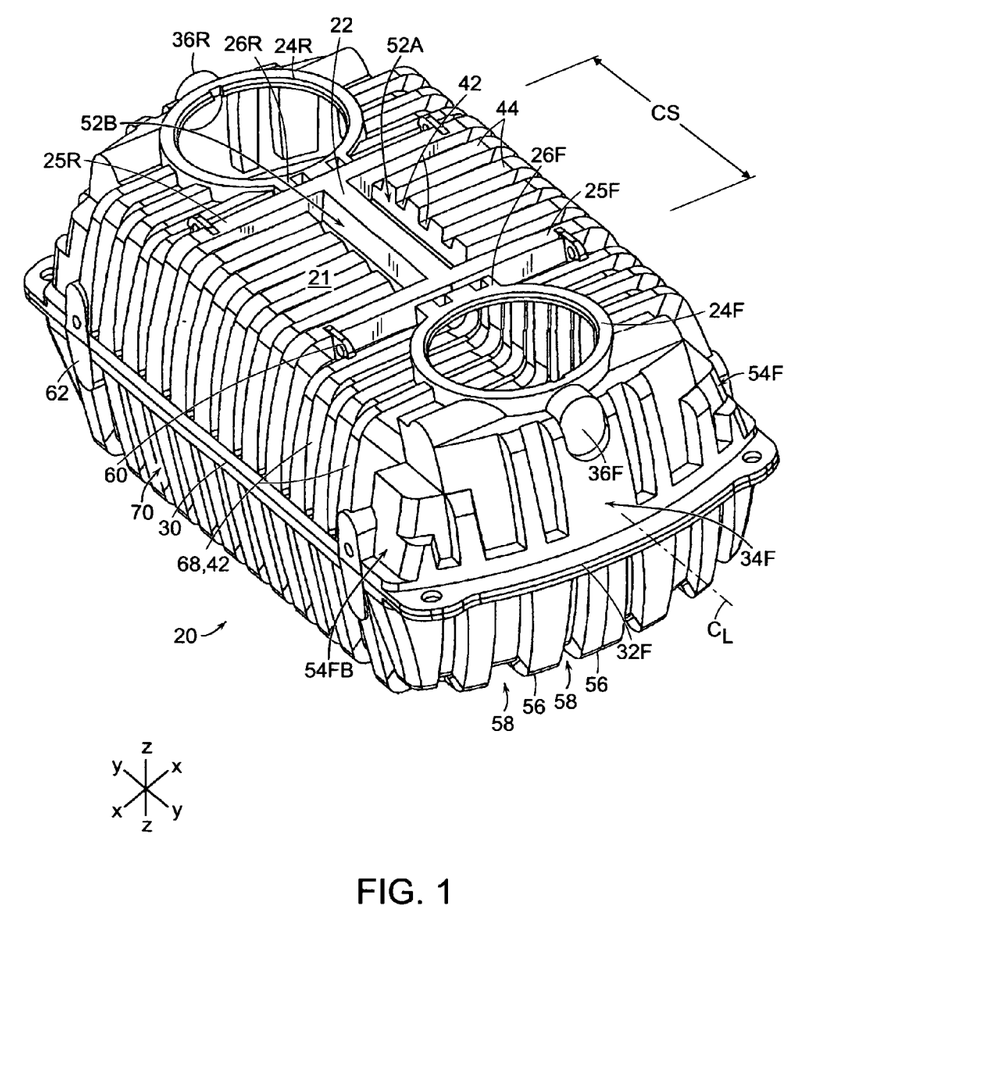
FIG. 1 is an isometric view of a septic tank, showing the top and an end.
Figure 2:
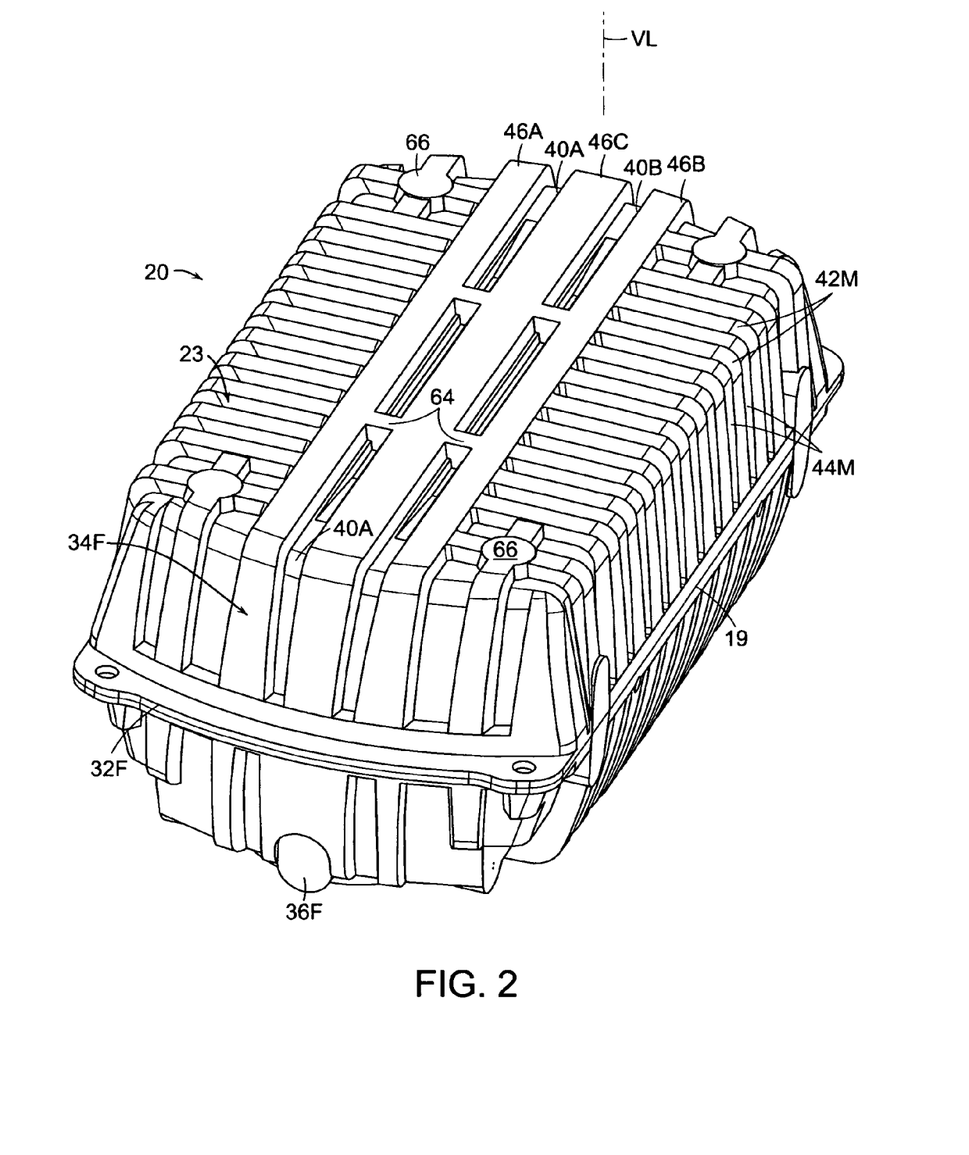
FIG. 2 is another isometric view of the FIG. 1 tank, showing the bottom.
Figure 3:
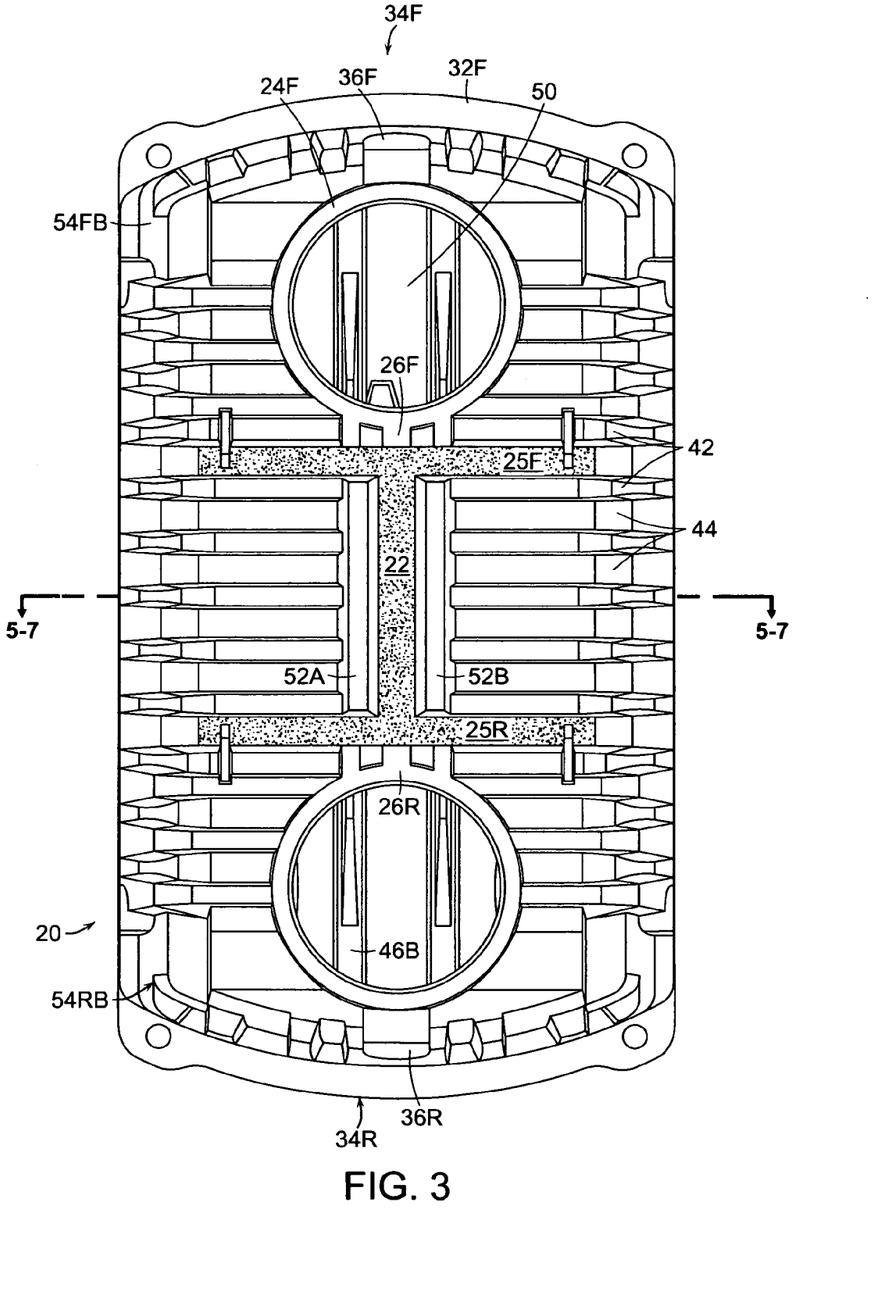
FIG. 3 is a top view of the tank of FIG. 1, with speckling to indicate a desired molded-in H-shape beam structure which lies nominally in the x-y plane of the top.
Figure 4:
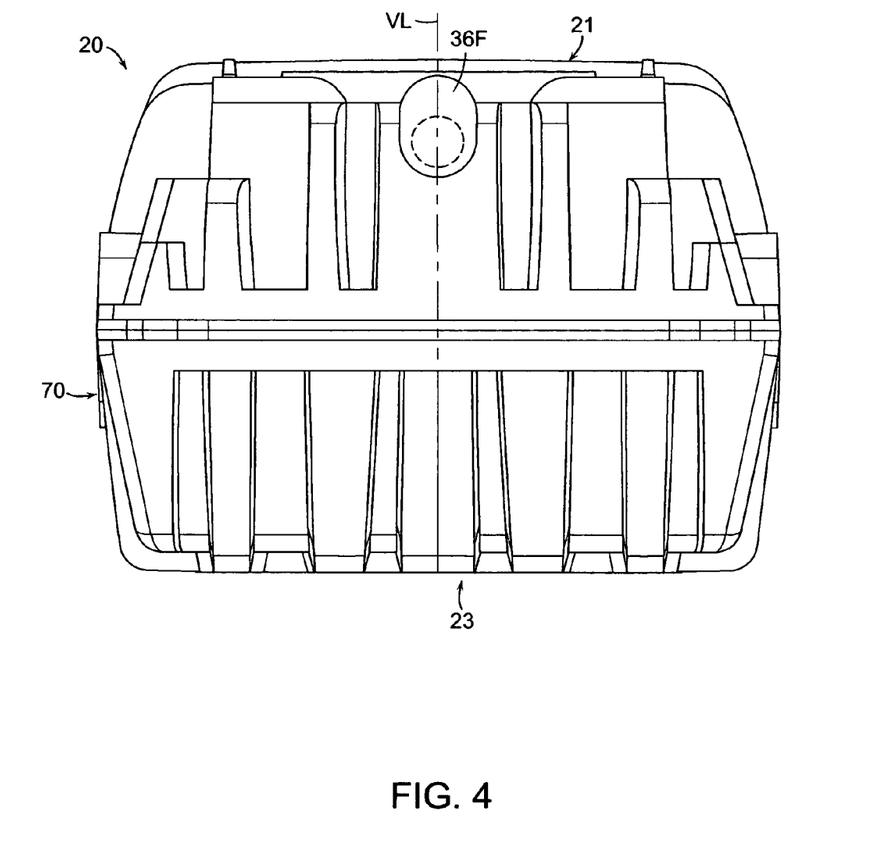
FIG. 4 is an elevation view of the front end of the tank FIG. 1.
Figure 7:
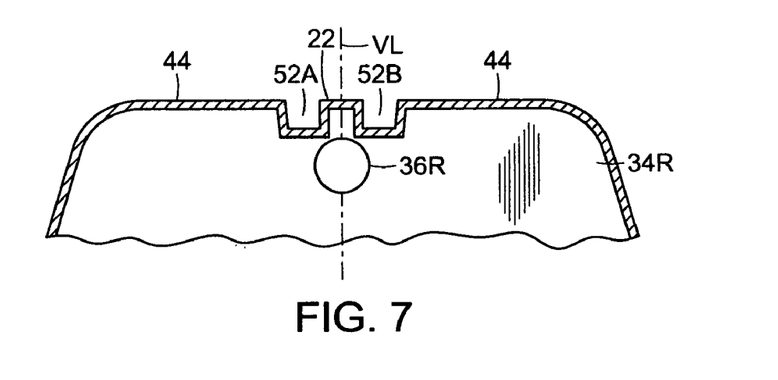
FIG. 7 is a transverse cross section view of a portion of the top of the tank, showing a portion of the molded-in lengthwise beam structure.

FIG. 1 is an isometric view of a molded plastic septic tank 20 with a superimposed x,y, z orthogonal axis system. FIG. 2 is similar and shows the bottom. FIG. 3 shows the top of the tank in plan view. FIG. 4 shows an end of the tank. FIG. 7 shows a cross section of the top of the tank. Tank 20 has a vertical cross section which is nominally rectangular; the tops and sides moderately bulge outward. A projection of the side or top of the tank into the vertical plane is rectangular. In an alternate another embodiment of the invention, where a tank has a cross section which approximates a circle, or where it has some other shape, it will be appreciated that the features of the present invention may be utilized. For instance, if the tank is circular in cross section, the transverse portions of the H shape molded-in beam, described below, will curve in the x direction.

Tank 20 has two spaced vertical ports 24, one at either end of the tank. An exemplary tank is about 124 inches long, about 66 inches wide and about 51 inches high and holds somewhat more than 1,000 gallons. It has two ports, each about 24 inch diameter. The ports 24 may comprise inserts or other strengthening features, not shown, to help resist distortion which would prevent good fit of hatch covers which close the ports off during use.

Tank 20 comprises a wall 70, which defines the interior volume of the tank. The wall 70 forms the bottom, sides and top. The wall 70 of the tank also defines the ends 34, which are nominally dome shaped with corrugations. The ends 34 have buttresses 36 that provide flat vertical surfaces through which a hole may be cut for inflow or outflow of water to the tank, as indicated by the dashed circle. The ends have beam like flanges 32 to provide for bending strength in the horizontal plane. Flanges 32 also engage the soil and help resist any buoyant forces when that tank is empty, which would tend to lift the tank. Within the scope of the present invention, the tank ends may have other constructions. Tank 20 has a plurality of support pads 62 on the opposing sides, for supporting the tank stably when it is set on its side, as for shipment. There is a plurality of lifting lugs 60 for attachment of lifting devices. There are also lifting holes in end flanges 32. The four corners of the upper half of the tank comprise a series of stepped portions, or buttresses, 54, which provide rigidity to the corners and therefore to the tank.

The top 21 of tank 20 is characterized by a central portion CS, which comprises the portion which lies between the hatch ports 24 and which in a 1000 gallon tank is about one-third of the whole tank length. In the region CS the circumferential surface of the tank is uninterrupted, as compared to being discontinuous where there are hatch ports.

Tank 20 has a multiplicity of corrugations running transverse to the length axis L (which axis extends in the y-direction). The transverse corrugations comprised of peak corrugations 42 separated by, or alternating with, valley corrugations 44. (The transverse corrugations are named in distinction to the lengthwise corrugations, which as described below which have the character of providing a molded-in lengthwise beam structure.) At the top of the tank, and at the bottom, the transverse corrugations 42, 44 run generally horizontally, except to the extent they may be interrupted by lengthwise beam structures or ports. The walls 70 at the opposing left and right sides of the tank, as can be seen in the end view of FIG. 4, are nominally vertical and bow outwardly at the vertical midpoint. At such nominal midpoint, there is a lengthwise non-corrugated portion 30 (along the length of which runs a mold parting line 19; See FIG. 2). The plurality of transverse corrugations which run across the top toward the ports 24, attach to the circumferential ring structures of the ports.

In the tank 20 pictured in the Figures, the transverse corrugations 42, 44 which run across the top and down the sides of the tank do not connect with the like corrugations which run across the bottom and up the sides of the tank, since they are separated by panel 30. See FIG. 1. The portion 30 can be conceived as presenting a lengthwise band which interconnects the tops of the peak corrugations 42. In an alternate embodiment tank, not shown, there is no band portion 30 and the transverse corrugations on the top half of the tank connect with those on the lower half of the tank.

The tank top and bottom have additional features which provide strength to the tank, greater than the transverse corrugations. In particular, the features both resist bending in the z plane, i.e., along the length axis L, and resist compression or accordioning of the tank, as under a vacuum test. In particular, there is one or more lengthwise molded-in beam shapes. In cross section the molded-in beam shapes are like corrugations. The lengthwise corrugations may be continuous or discontinuous along the length of the tank, as described below. Those in the top will be first described.

As shown best in the FIGS. 1, 3 and 7 embodiment of tank, corrugation 22 runs lengthwise between two spaced apart transverse corrugations 25R and 25F which are respectively in close proximity to the ports 24R and 24F. Lengthwise valleys 52A, 52B lie on the left and right sides of lengthwise corrugation 22. In FIG. 3, the structures 22, 25 are pictured with speckling to highlight the H-shape of the combination. In an alternate embodiment, there are no transverse corrugations 25 and the corrugation 22 runs between the structure of the ports 24.

The transverse corrugations 25, which are simply particular peak corrugations 44, run down the opposing sides of the tank. In the generality of the invention, they may only run partially or fully across the top to proximity of the left and right top edges. FIG. 1 and FIG. 3 show how transverse corrugations 25 are connected to the ring-like structure of ports 24 by means of a plurality of connectors 26R and 26F. Connectors 26 can be conceived as presenting an E-shape structure combination with the structure of ports 24. See FIG. 3. Connectors 26 span the valleys 42 providing better cooperation between the H-shape beam structure and the ports, and with the transverse peak corrugations 68, 42 which connect to the structure of the ports 24. In an alternate embodiment of the invention, there are two spaced apart lengthwise corrugations 22 instead of the one pictured. In alternate embodiments, connectors 26 are instead solid; or there are no connectors 26.

As may be evident, the corrugation(s) 22 add strength to the top, in particular for resisting bending of the top in the continuous section CS which lies between the ports. The lengthwise corrugations 22 provide resistance against accordioning, and in such respect they cooperate with the ports 24 and the upper portions of the ends 34, including buttresses 46. As will be described, optional internal bracing may be used to further enhance the strength of the top.

Figure 6:
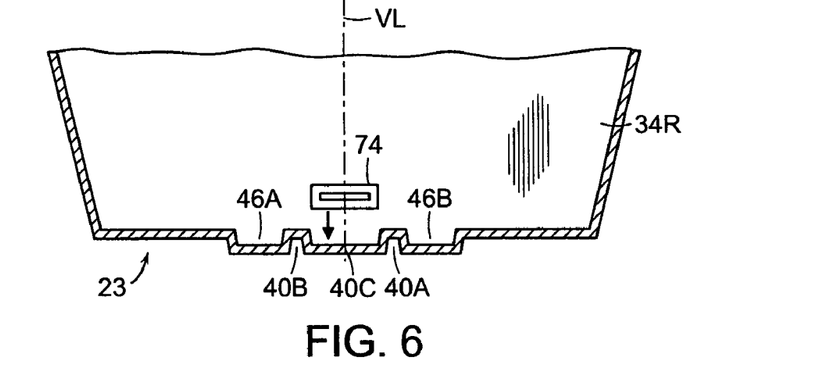
FIG. 6 is a transverse cross section view of a portion of the bottom of the tank, showing a supplemental beam which may be inserted and contained within a molded-in lengthwise beam structure of the tank wall at the bottom.

The tank bottom 23 has transverse peak corrugations 42M and valley corrugations 44M, similar to those described in connection with the top. They run up the sides of the tank as previously mentioned. The bottom 23 of the tank also has a lengthwise strengthening structure, as shown in FIGS. 2 and 6. In the embodiment shown, the wall 70 at the bottom 23 of the tank has three parallel lengthwise peak corrugations 46C, 46A and 46B; the latter two symmetrically spaced with respect to the vertical centerplane of the tank, which plane is indicated in the Figures by line VL. (Of course, when viewed from inside the tank, these same features appear as lengthwise cavities 46 as is seen in the partial vertical cross section of FIG. 6.) The lengthwise corrugations are also referred to here as molded-in beams. They are analogous in strengthening function to C-section beams, also called channels when free-standing, were such to be attached to the bottom of the tank. The tank bottom 23 also comprises four support pads 66 which are suited for supporting the tank bottom on a flat surface prior in storage or prior to installation.

Figure 8:
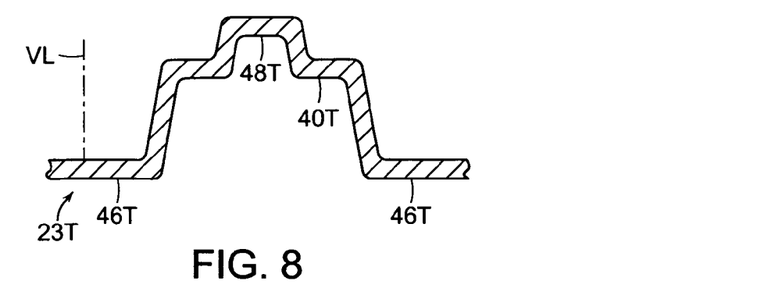
FIG. 8 is a fragmentary transverse cross section view of a portion of the bottom of the tank, showing a lengthwise molded-in beam structure, or rib, having a secondary rib, or sub-rib.

The lengthwise corrugations 46 are spaced apart from each other by discontinuous valleys 40A, 40B (which valleys appear as raised features inside the tank). Each valley may 40 have a sub-valley or rib, like sub-valley 48T, shown in FIG. 8 on valley 40T of alternative design wall bottom 23T. See also the following description about FIG. 10 and FIG. 11. In an alternate embodiment or valley reinforcement, not shown, the rib 48T projects in the opposite direction from the floor of the valley 48T, i.e., it projects outwardly from the chamber interior, compared to inwardly as in FIG. 8. The corrugations 46A, 46B, 46C preferably run lengthwise to the extent they continue around the corners at the ends of the tank bottom and run up the end walls 34 of the tank, as is readily visible in FIG. 2. Alternately, they may run only to the bottom end corners of the tank.

Figure 10:
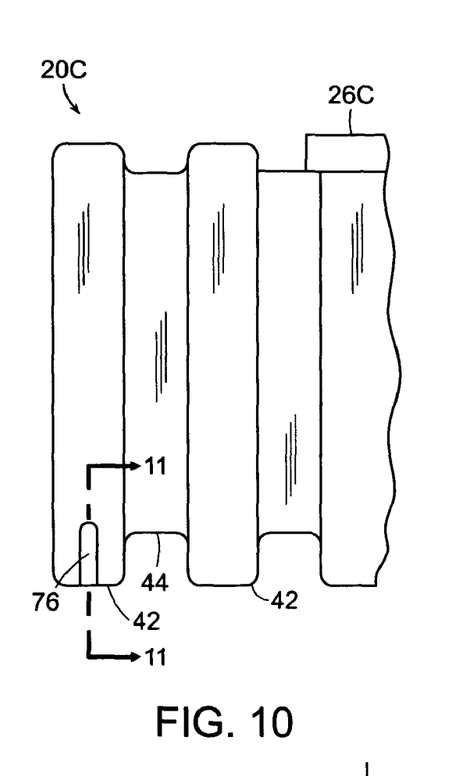
FIG. 10 is a side elevation view of an end portion of a corrugated tank, showing a reinforcing rib in one of the peak corrugations.
Figure 11:
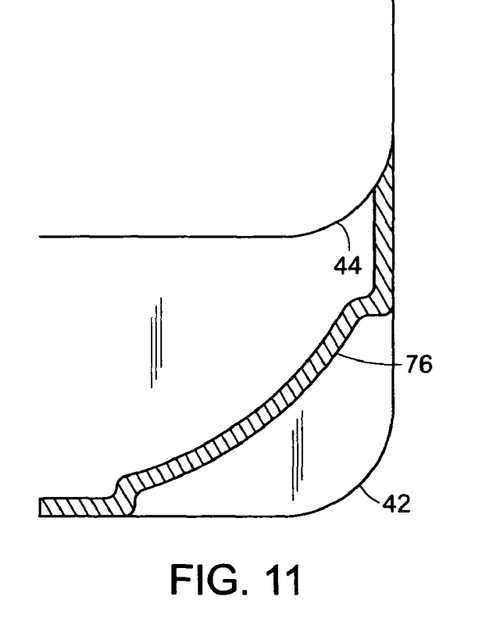
FIG. 11 is a vertical cross section through a portion of the tank shown in FIG. 10.
Figure 12:
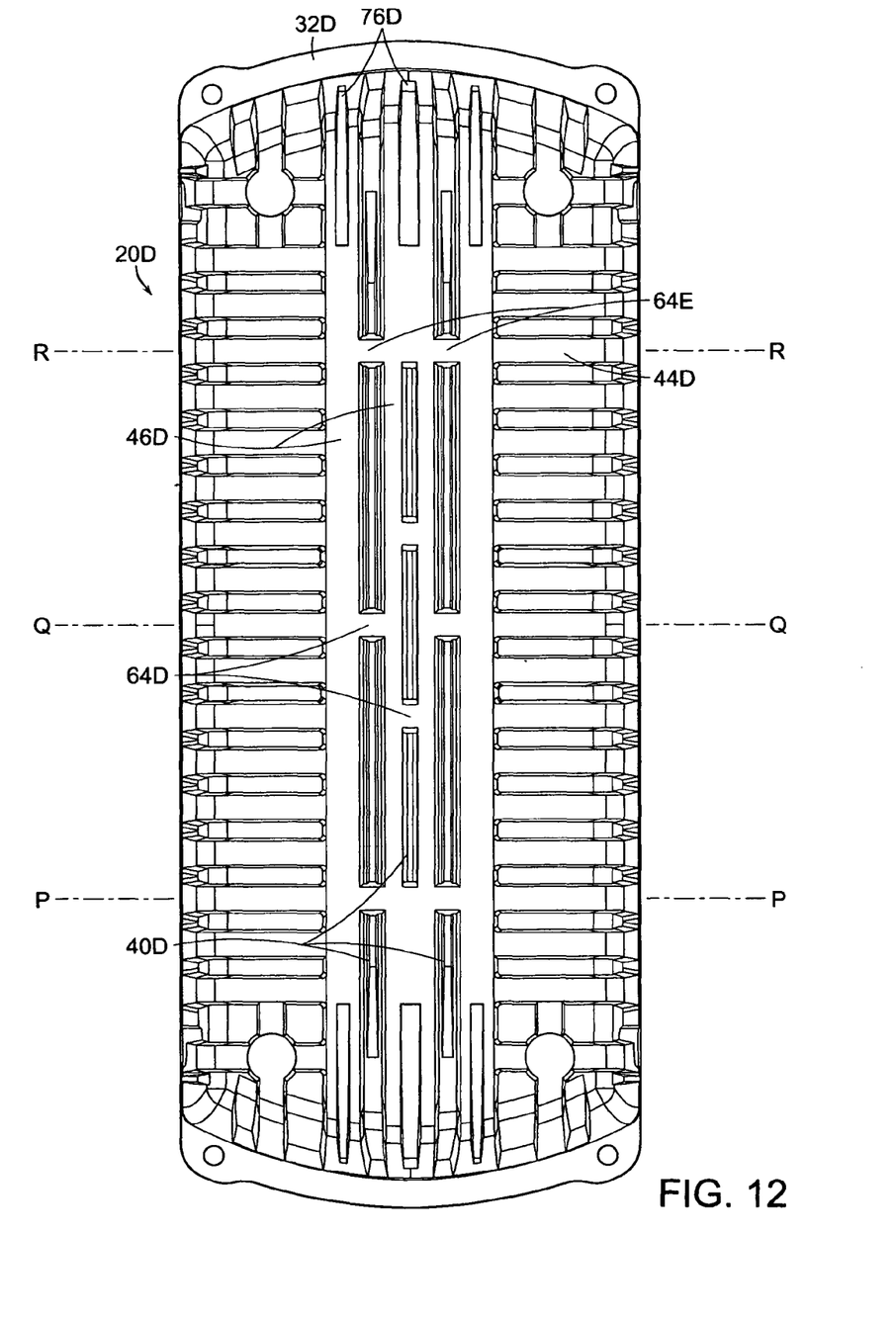
FIG. 12 is a bottom view of a corrugated tank having a multiplicity of parallel structural reinforcements running lengthwise.

FIG. 10 shows a portion of the bottom end of a tank 20C having a port 26C. The tank has transverse peak corrugations 42 and valley corrugations 44. One or more peak corrugations have a reinforcing rib 76 that runs along the corrugation surface. The configuration of the rib 76 is shown more particularly in FIG. 11 which is a cross section through the corrugation 42. FIG. 11 shows how the rib is shaped. Rib 76 preferably tapers to a lesser depth at each end of the rib, as illustrated. Alternately, the rib may not taper but may be more abruptly shaped at the rib ends. Similar kinds of ribs may be placed in the valley corrugations and in peak corrugations at the ends of the tank.

As shown in FIG. 2, the transverse corrugations 42M of the bottom 23 connect with the lengthwise corrugations 46A, 46B. In an alternate embodiment, the ends of the transverse corrugations may be spaced apart from the lengthwise corrugations, similar to the way in which the top corrugations 42 are spaced apart by lengthwise valleys 52 from lengthwise top corrugation 22. The lengthwise beam structure corrugations 46A, 46B, 46C on the bottom are interconnected by bridges 64, as shown in FIG. 2. The bridges are configured like transverse corrugations. Alternatively, the bridges may be omitted.

FIG. 13 shows the bottom of tank 20D which is longer and of greater capacity than tank 20; for example the tank can contain 1500 gallons. Tank 20D has four molded in lengthwise beam structure corrugations 46D which are spaced apart equally by intermittent valleys 40D. The parallel beam structures 46D are interconnected by bridges 64D. FIG. 13 illustrates that when certain bridges, for example bridges 64E, are aligned in the same vertical z-x plane (plane R in FIG. 13) with transverse bottom corrugations 44D, there is formed a continuous interior channel. This channel is useful for receiving the edges of a baffle which is described below.

Figure 5:
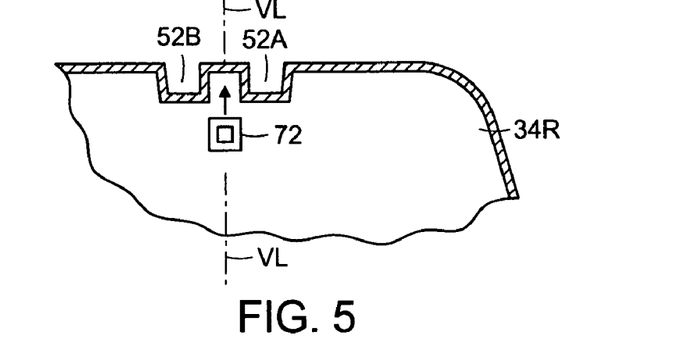
FIG. 5 is a transverse cross section view of a portion of the top of the tank FIG. 1, showing a beam element which may be inserted and contained within a molded-in beam structure of the tank wall at the top.

A tank may optionally be further strengthened with supplemental beam members. With reference to FIGS. 5 and 6, which are partial transverse vertical cross sections, a beam, 72, 74, which is fabricated separately from the tank, is inserted into the concavity of a lengthwise corrugations or molded-in beam. Exemplary beams 72, 74 are rectangular cross section hollow beams fabricated by pultrusion using iosphthalic polyester resin with long strand fiberglass reinforcement.

Beams 72, 74 may be used separately or in combination. Beams 72, 74 may put in place, as indicated by the arrows in the Figures, after the tank is fabricated. They may be held in place by vertical struts 74 which are described below. Alternately, beams attached to the wall of the tank by fasteners or other mechanical means, or by adhesives or welding as the nature of the beam material may permit. Alternately, beams may be placed within the mold when the tank is molded, to thus become captured in the structure of the tank wall during the molding process. Beam cross sections other than rectangular may be used. Separately formed beams may also be placed within the transverse corrugations which comprise the H shape structure on the top.

Figure 9:
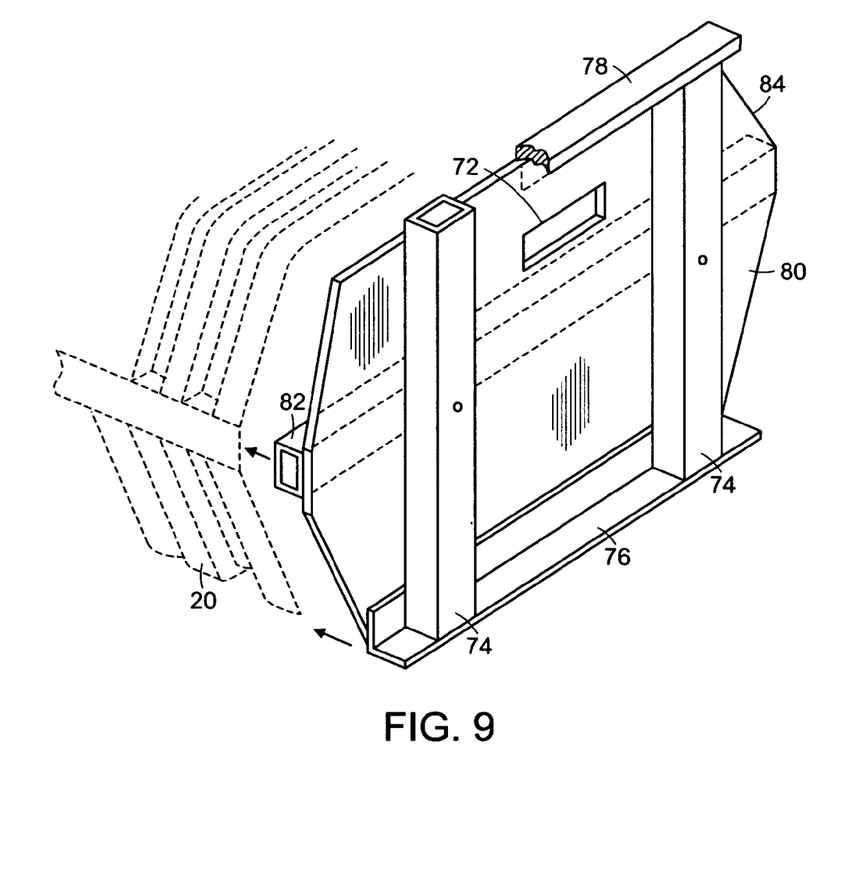
FIG. 9 is an isometric view of a strut and baffle assembly for supporting the roof and sides of the tank and for dividing the length of the tank into compartments.

FIG. 9 shows a combination of vertical struts 74 and horizontal strut 82 which strengthen the tank against vertical and horizontal forces. The struts, which may be constructed of the same kind of material as mentioned for the beams 72, 74, may be used with or without the presence of a baffle. The struts are positioned at a desired location within the length of the tank 20, a portion of which is shown in phantom in FIG. 9. The vertical struts will ordinarily be positioned to underlie the central circumferentially continuous body portion CS which lies between the access ports. For example, the struts may lie in the vertical plane containing the transverse corrugation 25F, which plane is approximately one-third of the distance along the length of the tank. The two spaced apart vertical struts 74 support the top of the tank against overlying loads. The horizontal strut 82 supports the sides of the tank against inward movement. In a smaller tank having a construction like that shown in FIG. 1, only one vertical strut may be used. Of course, more than two vertical struts and more than one horizontal strut may be used. The struts may be fastened to one another or to the tank by means of mechanical fasteners.

In a longer-body tank, for instance in a tank like that shown in FIG. 13, multiple sets of struts may be positioned at spaced apart locations between the access ports. For example, struts may be located at each of the transverse planes P, Q, R illustrated in FIG. 13. The top and bottom ends of the vertical struts may engage horizontally running angle beams 76, 78, as shown in FIG. 9, so that any strut-load is not concentrated on the wall. Alternately, the vertical struts may engage lengthwise beams, described above, which are within the tank. Alternately, local pads or reinforcement may be used, or the struts may directly engage the wall of the tank without any intervening member, if concentration of load on the wall is not a concern.

As shown, the struts also enable the positioning of a plastic sheet baffle 80 which has a through-hole 72 for liquid flow. Such baffles are familiar for dividing an upstream part of the tank from a downstream part. Preferably, the vertical struts are on the downstream side of the baffle to provide support to the center part the baffle, and the baffle is sandwiched between those vertical struts and the horizontal strut 82 and fastened to them. The baffle has a peripheral edge dimension that engages the interior surface of peak corrugations 42. For example, the bottom of the baffle (and the angle beam 76, fit within the confines of the bridges 64 of tank 20 and the confines of the peak corrugations at the bottom and sides which are aligned with the bridges.

In an embodiment of the invention, the tank is made of solid polyethylene, polypropylene or other polyolefin. In another embodiment the wall 70 has three polyethylene layers, the center of which is comprised of closed cell polyethylene foam, for example, foamed polyethylene having a density of 10 lb. per cu. ft., alternately 20 lb. per cu. ft. The layers which are integrally connected, since they are melt-fused to each other during a rotational molding process described below. The layers cooperate to provide a wall that has particularly favorable properties insofar as utilization of material, flexural modulus, and impact strength are concerned. Sometimes the outer layer may be comprised of two solid sub-layers. There may be fewer and more than three layers. In an embodiment, the tank composite wall is comprised of a solid outer layer, a foam middle layer having a density less than about 55 percent of the outer layer, and a solid inner layer which is thinner than the outer layer. A typical outer layer is 0.15 inch thick, a middle layer is 0.5 inch thick, and the inner layer is 0.05 inch thick. The wall construction and other features of the present invention are described more particularly in a commonly owned U.S. patent application Ser. No. 12/455,774, filed on Jun. 5, 2009 by Moore et al., entitled "Thermoplastic Septic Tank Having Composite Wall", the disclosure of which is hereby incorporated by reference. Rotational molding may be used to make thermoplastic tank embodiments of the present invention. In the common commercial rotational molding process, a hollow aluminum mold is heated and rotated about three orthogonal axes simultaneously, to melt and distribute about the mold inner surface plastic granular material which is placed within the mold. The mold is then cooled, split open, and the hollow molded article is removed. The process used in the invention is described more particularly below. An embodiment of tank in the invention has ribbing or corrugations for strength. The tanks are preferably made of high density or low density polyethylene (HDPE, LDPE), alternately of polypropylene (PP), another polyolefin, or another thermoplastic. The shortened term "plastic" has been used herein to refer to thermoplastic.

The tank of the invention can be made using the Leonardo™ rotational molding system of Persico S.p.A, a manufacturer in Nembro, Italy. The Leonardo system comprises automated equipment and is subject to various published patent applications. In the system, heating and cooling of the mold is achieved by channeling hot or cool liquids through or around the molds which are shaped to receive plastic internally and thereby form the part. The system is good at achieving selective temperatures throughout the mold, and obtaining good distribution of plastic within the mold, good wall thickness control, and high production rates.

While a particular embodiment of tank is described here, other septic tanks within the scope of invention may be shorter or longer, and wider and taller than the exemplary tank; they may have different cross sectional shapes. For instance the cross section may be nominally trapezoid or nominally round. Also, the ports may have other shapes than round, and the tanks may also be made of other non-metal materials than have been mentioned.

Although this invention has been shown and described with respect to one or more embodiments, it will be understood by those skilled in this art that various changes in form and detail thereof may be made without departing from the spirit and scope of the claimed invention.

We claim:

1. A molded plastic tank for receiving and treating wastewater, having a generally oblong body comprised of a plastic wall and opposing end caps spaced apart along the tank length, the body having a generally rectangular or circular cross section; the tank having at least two spaced apart access ports at the top of the tank, disposed on either side of the midpoint of tank length, for providing access to the interior of the tank during use; the body wall having a plurality of corrugations running transverse to the tank length on the sides of the tank and on at least a portion of the top of the tank; said wall at the top of the tank shaped as a molded-in beam structure comprised of (a) at least one peak corrugation running lengthwise along the tank top from proximity of one access port to proximity of the other access port and (b) a lengthwise valley corrugation on each side of said at least one lengthwise peak corrugation, to space apart the lengthwise corrugation from the ends of at least some of said transverse corrugations at the top of the tank.

2. The tank of claim 1 wherein said single lengthwise peak corrugation is connected at each end to a transverse peak corrugation which runs across the top of the tank in proximity to a port, the combination of three peak corrugations creating an H shape integral beam structure.

3. The tank of claim 2 wherein said ports comprise circumscribing ring structures, further comprising one or more bridge connectors connecting a port ring structure to a proximate transverse corrugation of said H shape beam structure.

4. The tank of claim 1 further comprising: at least one lengthwise peak corrugation forming an integral molded-in beam structure running substantially along the length of the bottom of the tank.

5. The tank of claim 4, wherein a lengthwise peak corrugation at the top of the tank and a lengthwise peak corrugation at the bottom of the tank each provide lengthwise cavities within the interior of the tank, further comprising: a separate component beam positioned within the interior cavity of at least one of said lengthwise peak corrugations.

6. The tank of claim 1 further comprising lengthwise bands on opposing sides of the tank, running along the midpoint elevation of the tank and intersecting the transverse corrugations running vertically on the sides of the tank.

7. The tank of claim 1 wherein the tank body has a generally rectangular cross section; and, wherein each opposing tank end cap comprises: (a) a plurality of buttresses or steps at each of the two top corners, and (b) a horizontal end beam.

8. The tank of claim 4 further comprising: (a) at least two lengthwise peak corrugations at the bottom of the tank; (b) a lengthwise valley corrugation in the center of the bottom of the tank, between said lengthwise peak corrugations; and, (c) at least one bridge running transverse to said at least one valley corrugation, to interconnect the lengthwise peak corrugations.

9. A molded plastic tank for receiving and treating wastewater, having a generally oblong body comprised of a plastic wall and opposing end caps spaced apart along the tank length, the body having a generally rectangular or circular cross section; the tank having at least two spaced apart access ports at the top of the tank, disposed on either side of the midpoint of tank length, for providing access to the interior of the tank during use; the body wall having a plurality of peak corrugations and valley corrugations running transverse to the tank length on the sides of the tank and across a portion of the bottom of the tank; at least two peak corrugations running lengthwise along the wall at the bottom of the tank; a valley corrugation running lengthwise between said at least two peak corrugations; and, a plurality of bridges running transverse to said at least one valley, to interconnect the lengthwise peak corrugations, wherein at least one bridge is discontinuous with a transverse-running peak corrugation.

10. The tank of claim 9 wherein said at least two peak corrugations run along substantially the whole length of the bottom of the tank.

11. The tank of claim 9 having four peak corrugations and three valley corrugations and a multiplicity of bridges.

* * * * *